United States Patent
Libes et al.

(10) Patent No.: US 7,617,192 B2
(45) Date of Patent: Nov. 10, 2009

(54) METHOD AND SYSTEM FOR CAPABILITY CONTENT SEARCH WITH MOBILE COMPUTING DEVICES

(75) Inventors: Michael Libes, Bainbridge Island, WA (US); Brian Lent, Bellevue, WA (US)

(73) Assignee: Medio Systems, Inc., Seattle, WA (US)

(*) Notice: Subject to any disclaimer, the term of this patent is extended or adjusted under 35 U.S.C. 154(b) by 246 days.

(21) Appl. No.: 11/373,588

(22) Filed: Mar. 9, 2006

(65) Prior Publication Data

US 2006/0248062 A1    Nov. 2, 2006

Related U.S. Application Data

(60) Provisional application No. 60/660,489, filed on Mar. 9, 2005, provisional application No. 60/749,720, filed on Dec. 12, 2005.

(51) Int. Cl.
G06F 7/00 (2006.01)
G06F 17/30 (2006.01)

(52) U.S. Cl. .................................................. 707/3
(58) Field of Classification Search ................ None
See application file for complete search history.

(56) References Cited

U.S. PATENT DOCUMENTS

| | | | |
|---|---|---|---|
| 6,370,541 B1 * | 4/2002 | Chou et al. | 707/103 X |
| 6,728,704 B2 * | 4/2004 | Mao et al. | 707/3 |
| 2001/0047354 A1 | 11/2001 | Davis et al. | |
| 2002/0169764 A1 | 11/2002 | Kincaid et al. | |
| 2002/0198869 A1 | 12/2002 | Clark | |
| 2003/0158839 A1 | 8/2003 | Faybishenko et al. | |
| 2003/0217335 A1 | 11/2003 | Chung et al. | |
| 2004/0093327 A1 | 5/2004 | Anderson et al. | |
| 2004/0186769 A1 | 9/2004 | Mangold et al. | |
| 2004/0199496 A1 | 10/2004 | Liu et al. | |
| 2005/0091106 A1 | 4/2005 | Reller et al. | |

(Continued)

FOREIGN PATENT DOCUMENTS

WO    WO2004/090787 A2    10/2004

OTHER PUBLICATIONS

Sheth et al, Federated Database Systems, Sep. 3, 1990, ACM Computing Surveys, vol. 22, 192-194, 220-221.*

(Continued)

*Primary Examiner*—Pierre M Vital
*Assistant Examiner*—Jason Liao
(74) *Attorney, Agent, or Firm*—David A. Hall; Townsend and Townsend and Crew, LLP

(57) ABSTRACT

A computer system and method for processing a search query directed to a database first inquires of multiple searchlet applications as to whether each respective searchlet is capable of performing the search query and then, if an affirmative response is received, passes the search query to the affirmatively responding searchlets, such that each searchlet returns a response comprising a single page, or no page at all if the search fails. Communication of the search query to the searchlets is managed by a content broker process. Each searchlet includes methods for searching a particular category of content, generating an index of the content, performing a search on the index, and returning search results.

18 Claims, 10 Drawing Sheets

U.S. PATENT DOCUMENTS

| | | |
|---|---|---|
| 2005/0131762 A1 | 6/2005 | Bharat et al. |
| 2005/0137939 A1 | 6/2005 | Calabria et al. |
| 2005/0222901 A1 | 10/2005 | Agarwal et al. |
| 2006/0149625 A1 | 7/2006 | Koningstein |

OTHER PUBLICATIONS

Lexus Nexis (www.lexis-nexis.com), 2004, Accessed on Nov. 4, 2008.*

An Interview with Kendall F. Svengalis, Apr. 1, 2000, Gale Group Newswire ASAP, vol. 19 No. 4, pp. 1-2. (located in "Shepard,pdf").*

Shepard's vs Keycite—Part I, Jul. 28, 1999, Information Access Company, vol. 8 No. 7-3, p. 1, (located in "Shepard.pdf").*

Meng, Weiyi, et al. "Building Efficient and Effective Metasearch Engines", *ACM Computing Surveys*, Mar. 2002, 34(1):48-89.

Glover, Eric J., et al. "Architecture of a Metasearch Engine that Supports User Information Needs", *Proceedings of the 8th International Conference on Information Knowledge Management, CIKM '99*, Kansas City, Missouri, Nov. 2-6, 1999, pp. 210-216.

\* cited by examiner

METHOD AND SYSTEM FOR CAPABILITY CONTENT SEARCH WITH MOBILE COMPUTING DEVICES

CROSS-REFERENCE TO RELATED APPLICATIONS

This application claims the benefit of U.S. Provisional Application No. 60/660,489 filed Mar. 9, 2005 entitled Search Application for Mobile Content and claims the benefit of U.S. Provisional Application No. 60/749,720 filed Dec. 12, 2005 entitled Mobile Device Advertising Platform. The disclosures of 60/660,489 and 60/749,720 are incorporated herein by reference in their entirety.

BACKGROUND

The present invention relates to content search systems for use with computing devices and, more particularly, to search systems for use with mobile computing devices.

Computing networks are commonly used in everyday life. The most ubiquitous example of a common computing network is probably the Internet. Millions of users get online to the Internet and retrieve information over the Internet daily, through the use of Internet browser applications that are able to "visit" Internet sites (collectively referred to as the World Wide Web). Most users access the World Wide Web through desktop or laptop computing devices through either wired or wireless network connections. A similar network is available to users with mobile platforms, such as Personal Digital Assistants (PDAs) and Web-enabled mobile telephones, who generally gain access to the Internet through a wireless connection.

One common network activity is to search for Internet sites that have content of interest. Internet sites are collections of "pages" that can be reviewed with appropriate browsers. Search queries can be submitted and pages that are relevant to the search query terms can be returned to a user's browser for viewing. The returned search results comprise a collection of links to pages of relevance to the search query.

Mobile search, however, is different from a typical Web search or Enterprise search. Mobile searches are typically requested by users who subscribe to a mobile Internet or mobile data access service in addition to a mobile (cellular) telephone service. Internet or mobile data access service in addition to a mobile (cellular) telephone service. Mobile subscribers are not typically performing searches as part of a research task, as is common with a Web search. Moreover, mobile subscribers are typically not searching for specific documents, as is common with Enterprise search (such as with document management systems). Instead, mobile subscribers are typically searching for mobile-centric merchandise, such as ringtones, or they are searching for small summaries of information, such as the latest news, sports score, weather, retail product price comparison or traffic report, or they are searching for services, such as a restaurant, laundry, or vehicle service stations. Some of these searches might also be location-sensitive, with the goal to find the "nearest" search result to the present physical location of the user (e.g., "nearest gasoline station"). In this discussion, "mobile" will be understood to refer to a wide range of mobile computing devices, including "smart" cell telephones, web-enabled telephones, Web-enabled PDAs, and the like, although such devices will be collectively referred to as mobile handsets and will collectively be described in the context of mobile handsets.

Mobile search and PC-based search systems also differ due to the significant user interface limitations on mobile handsets. With rare exceptions, a PC includes a keyboard and 15 inch or larger monitor. A common mobile handset includes only a 12-key keypad, 5-way navigation control, and a 2-inch or 3-inch display. These limitations shorten the average length of search queries for mobile and greatly limit the amount of information which can be conveniently viewed by the searcher.

Furthermore, mobile handsets have on average far less computing power than PC's, far less memory, slower network access, and longer latencies in the communications networks. These limitations further hinder the mobile search experience vs. PC-based search.

Due to these and other differences, mobile search is focused far more on providing direct answers to queries than is typical for Web search or Enterprise search. Providing answers, instead of references (i.e., links) to relevant pages that might contain the answers is a much more computationally and algorithmically difficult problem to solve.

It should be apparent that the mobile user search experience would be improved if simpler and more immediately useful search results were returned. The present invention satisfies this need.

SUMMARY

Embodiments of the invention pertain to a computer system and method for processing a search query directed to a database by first inquiring of multiple applications, called "searchlets" herein, as to whether each respective searchlet is capable of performing the search query and then, if an affirmative response is received, passing the search query to the affirmatively responding searchlets, such that each searchlet returns a response comprising a single page, or no page at all if the search fails. Communication of the search query to the searchlets is managed by a content broker process. Each searchlet includes methods for searching a single category of content, generating an index of the content, performing a search on the index, and returning search results. In this way, useful search results comprising pages of information are quickly and efficiently returned to users for presentation and viewing.

In another aspect of the invention, the searchlet applications can be organized into tiers of searchlets, such that the content broker can more efficiently inquire to the searchlets as to whether a first tier of them is capable of performing the search query, proceeding to second and subsequent tiers of searchlets only if the preceding tier did not provide suitable or disambiguous results. The content broker includes processes for determining whether a returned searchlet response is ambiguous or has simply failed.

Other features and advantages of the present invention should be apparent from the following description of the preferred embodiments, which illustrate, by way of example, the principles of the invention.

DETAILED DESCRIPTION

In the following description, for purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form without unnecessary details that are known to those skilled in the art so as to avoid unnecessary details that could obscure understanding of the present invention.

These and other embodiments of the invention along with many of its advantages and features are described in more detail in conjunction with the text below and attached figures.

Figure 1:
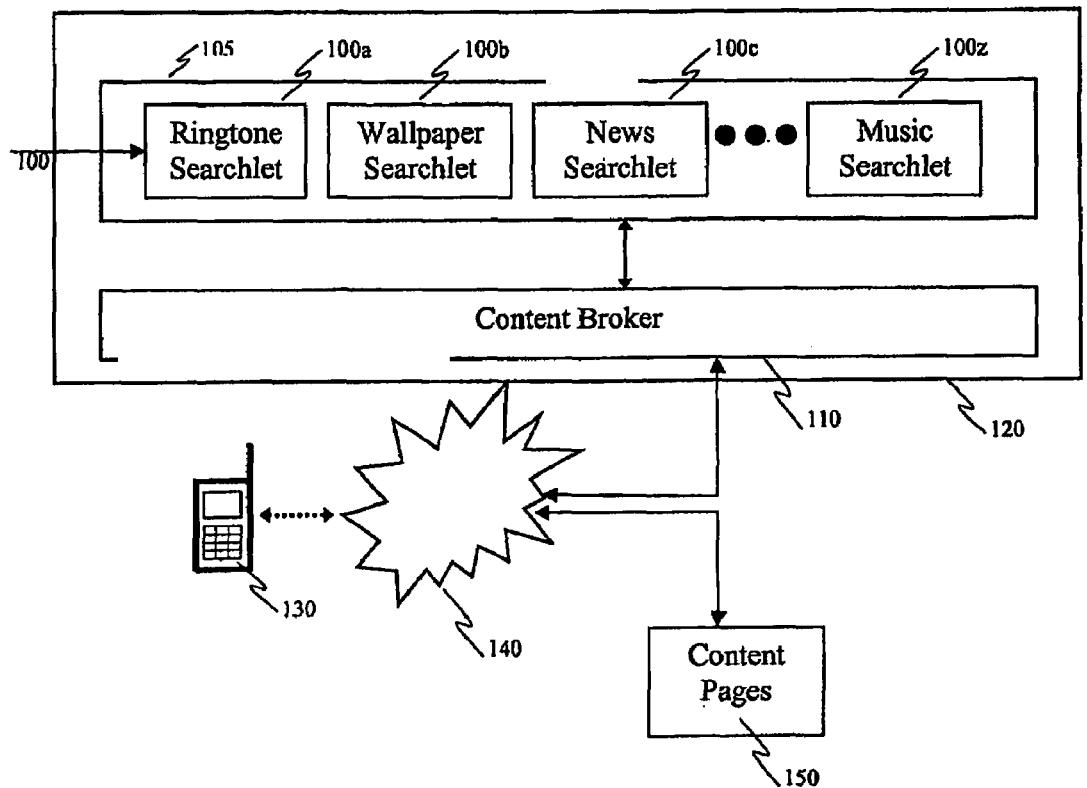
FIG. 1 is a block diagram that depicts a system 100 that supports a content broker search for mobile computing devices in accordance with the present invention.

FIG. 1 is a block diagram that depicts a system 120 that supports a content broker search for mobile computing devices by querying a modular collection of searchlet applications 100, each of which will be referred to herein as a "searchlet".

The searchlets 100 provide answers to unambiguous search queries and provide lists of answers to search queries categorized as ambiguous. A "Content Broker" 110 comprises a collection of methods that generates relevant answers from the collection of searchlets.

Each searchlet 100 is a stand-alone search engine written and tuned to a single specific category of content. For example, in FIG. 1, searchlets are shown with content to which they are tuned, respectively, including a Ringtone searchlet 100a, a Wallpaper searchlet 100b, a News searchlet 100c, and a Music searchlet 100z. Other searchlets, tuned to other categories of content, can be provided, as indicated by the dotted line (ellipses) in FIG. 1.

Each searchlet 100 includes the methods needed to: gather information about the searchable content to which it is tuned; generate a searchable index of keywords and other metadata; perform the search on that index; and generate the search results. For example, one of the searchlets 100 in FIG. 1 is labeled "Wallpaper Searchlet" 100b. This particular searchlet contains methods for: (a) "crawling" a catalog of downloadable wallpaper (a.k.a. images); (b) alternative methods for gathering that information via an information "feed"; (c) generating an index of wallpaper names, genres, and other wallpaper-specific metadata; (d) performing a search on that index; and (e) generating pages of results describing individual wallpapers and lists of wallpaper. Those skilled in the art will understand the suitable corresponding methods that would be appropriate for inclusion in searchlets tuned for other content, in view of the discussion herein.

As seen in FIG. 1, a mobile computing device (e.g. a cellular telephone handset or a Web-enabled PDA) 130 communicates via a mobile services network 140 to the mobile search system 120. The search system includes a search server component referred to herein as the Content Broker 110. The Content Broker communicates with a collection 105 of multiple searchlets 100, each of which is tuned to search over collections of pages for different content. Searchlets can be tuned to search for content as specific as pages from a single content provider, e.g. CNN, or can be tuned to search for a generalized category of content, e.g. pages relating to current news stories, or other content or information located in a searchable database. The system 120 described herein utilizes multiple searchlets 100 which together cover a wide range of searchable content.

Figure 2:
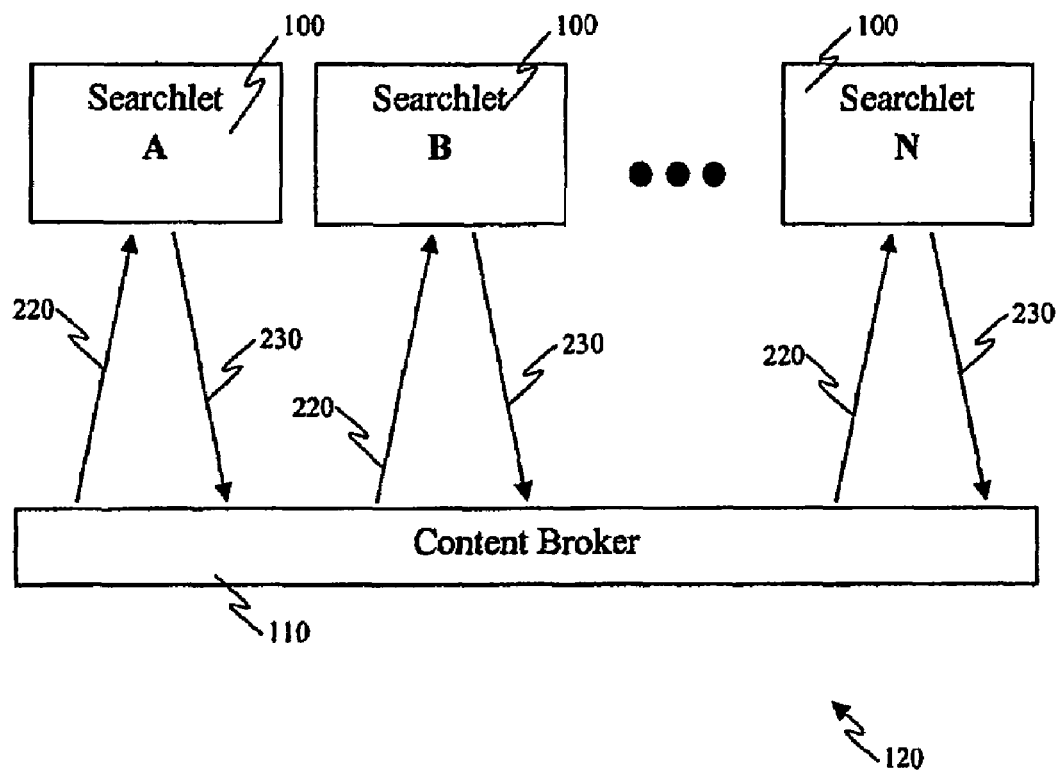
FIG. 2 is a depiction of the mobile search system in FIG. 1 shown in greater detail.

FIG. 2 is a depiction of the mobile search system 120 in greater detail. The searchlets 100 are computer processes that can be located separately from the Content Broker 110. The searchlets can use commonly understood replication and clustering methods to aid in scaling a mobile search system to handle millions of simultaneous searches. The Content Broker can reside or be executing on the same computer system as the group 105 of searchlets, or the searchlets 100 and Content Broker can be deployed on multiple separate computers, though they must be able to communicate with each other. The exact communications means between Content Broker and the searchlets is unimportant to the function of the system 120. The only requirement for operation is that there be a means of communication that allows for digital information, comprising search requests and queries 220 from the Content Broker and search replies and results 230 from the searchlets, to be passed between the Content Broker 110 and the searchlets 100. The Content Broker sends requests 220 to each searchlet which, barring failures, always results in a reply 230 by the searchlet.

Figure 3:
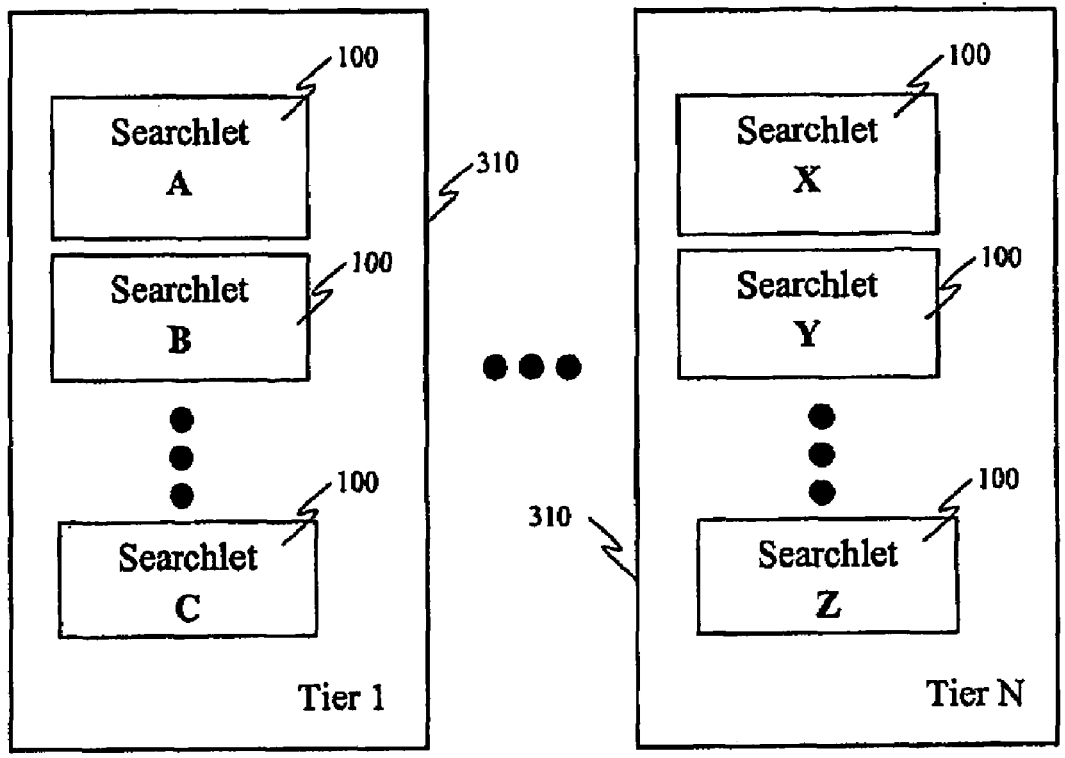
FIG. 3 shows a tier hierarchy into which the searchlets are divided, to support differential processing in the FIG. 1 system.

FIG. 3 shows a tier hierarchy into which the searchlets 100 are divided, to support differential processing. In particular, when a search query is processed by the Content Broker 110, not all the searchlets need be involved in generating a response. As shown in FIG. 3, the searchlets are divided into one or more "tiers" 310 such that each tier contains one or more of the searchlets. The tiers are implemented for the purpose of increasing search efficiency, relevancy and decreasing the time to return relevant search results—all of which are important elements of a successful mobile search experience.

The tiers 310 are predetermined sets or groupings of searchlets that can be decided upon or defined by a system administrator or other designated person at the time of system initiation or configuration. The tiers are typically arranged so as to reflect a hierarchy that places the most popular (i.e., most often used) searchlets in the first tier, and places searchlets that are less often used (as being tuned to less popular categories) in subsequent tiers. For example, a likely grouping for a first tier of searchlets in view of currently popular searches would include searchlets for games, traffic reports, ringtones, weather, wallpaper, news, and horoscopes. A second tier collection of searchlets might include searchlets tuned for general Web searches, image searches, dictionary lookups, and shopping product lookups. Depending on the system and collection of Web pages available, there may be only one tier in the search system searchlets 105, or perhaps only two tiers. The system does not require multiple searchlet tiers to operate properly.

Figure 4:
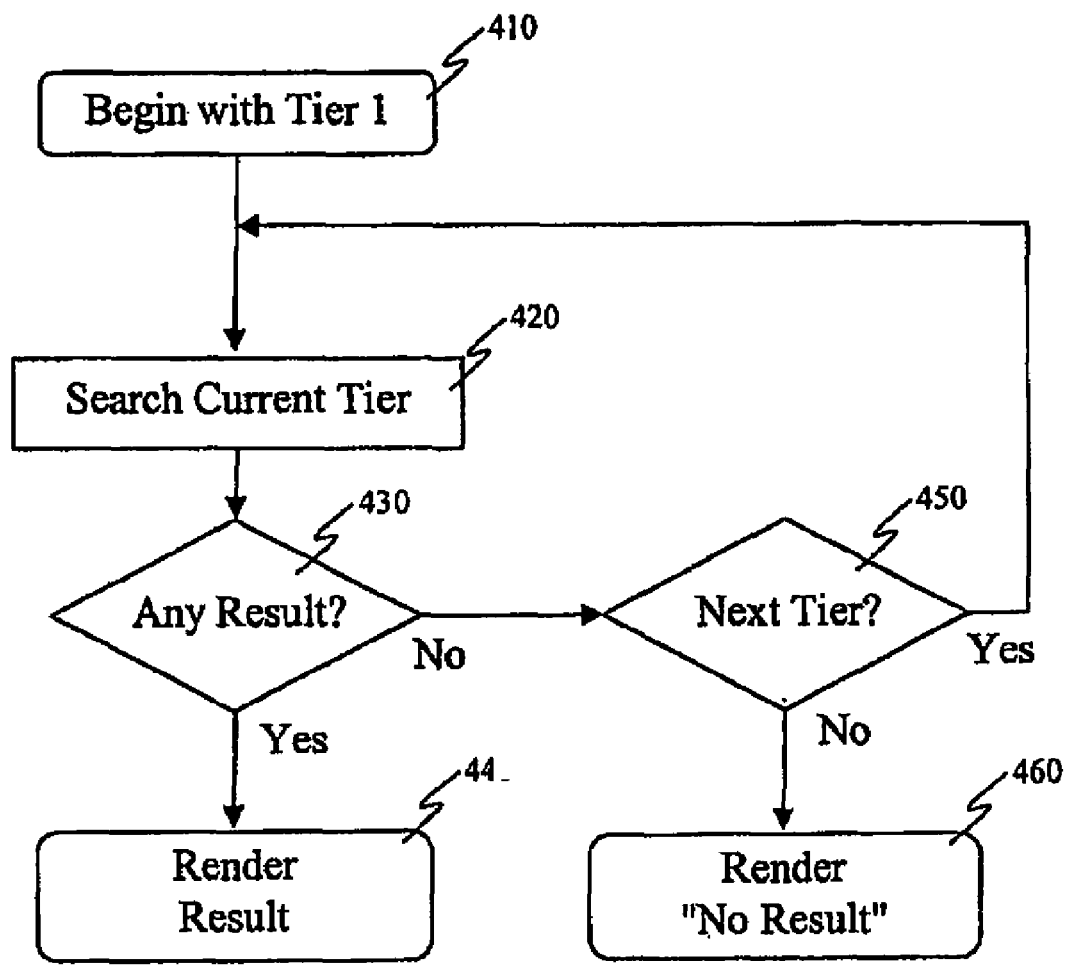
FIG. 4 is a flow diagram that shows the operating logic in performing searches across multiple searchlet tiers in the FIG. 1 system.

FIG. 4 is a flow diagram that shows the operating logic that is executed in performing searches across multiple searchlet tiers. To process a search query, the Content Broker begins with the searchlets in Tier 1, as represented by the flow diagram box numbered 410. Thus, at 420, the Content Broker provides the search query to all the searchlets in the current tier, which is Tier 1. If at least one match is returned, an affirmative "Yes" result at the decision box numbered 430, then the searching process ceases and the Tier 1 result is provided to the user, as indicated by the rendered result box 440 in FIG. 4. If there are no matches from the current tier (Tier 1), a negative "No" outcome at the decision box 430, then the Content Broker moves on to the next tier of searchlets at box 450. If there are no more tiers available to search, a negative "No" outcome at the decision box 450, then a special "no results" outcome is provided and the user search is halted at 460. If there is another tier of searchlets, an affirmative "Yes" outcome at the box 450, then that next tier becomes the current tier (being processed) and the Content Broker repeats the processing with the next tier at box 420. The process repeats in this fashion until there are no more available tiers to be searched (at box 460).

Figure 5:
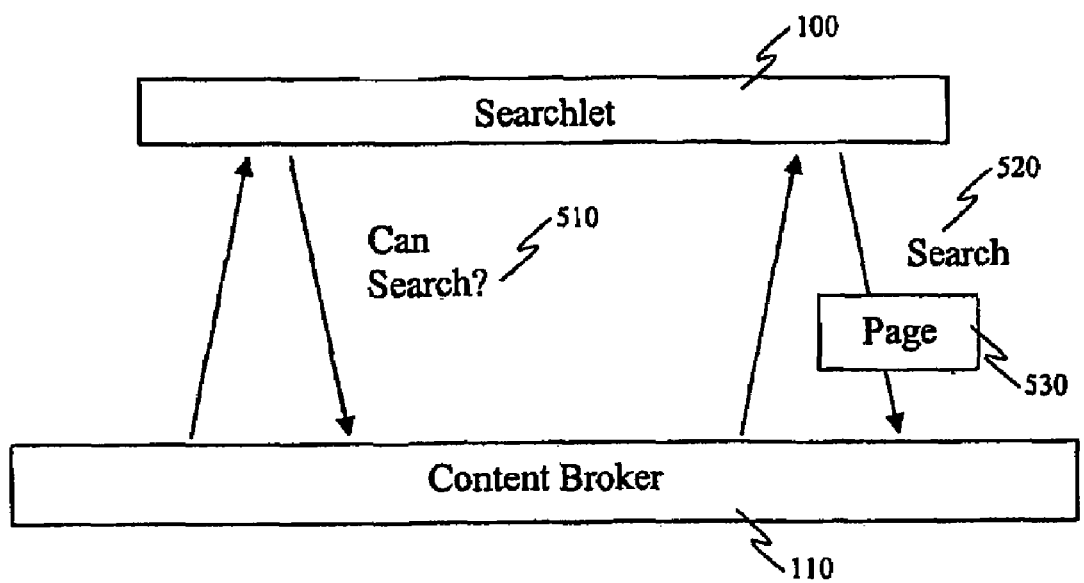
FIG. 5 is a depiction of the FIG. 1 system that shows further detail of the communications between the Content Broker and a searchlet.

FIG. 5 is a depiction that shows further detail in the communications between the Content Broker 110 and a searchlet 100. The interaction between the Content Broker and each searchlet provides advantageous features in accordance with the invention. In the search system 120 (FIG. 1), the search process is divided into two pieces or interactions. The first interaction 510 is depicted in FIG. 5 as the "Can Search" interaction. This interaction occurs because, before providing a searchlet with a user search query to be performed, the Content Broker always first asks the searchlet if the searchlet can perform the search. The searchlet, using internal evaluation methods, determines if it is tuned sufficiently to capably perform the search and returns a search capability response. The Content Broker has a second interaction 520 depicted in FIG. 5 as the "Search" interaction. The Search interaction 520 occurs if the searchlet has responded affirmatively to the Can Search interaction 510 and the Content Broker has provided the searchlet with the query to perform the actual search. The result of a Can Search interaction is a results page, indicated in FIG. 5 as "Page". In the system 120, a Page can be rendered into any number of formats depending on the type of user computing device and associated system integrated with the search system. Such Page formats include but are not limited to XML, WML, XHTML, and Flash formats.

Figure 6:
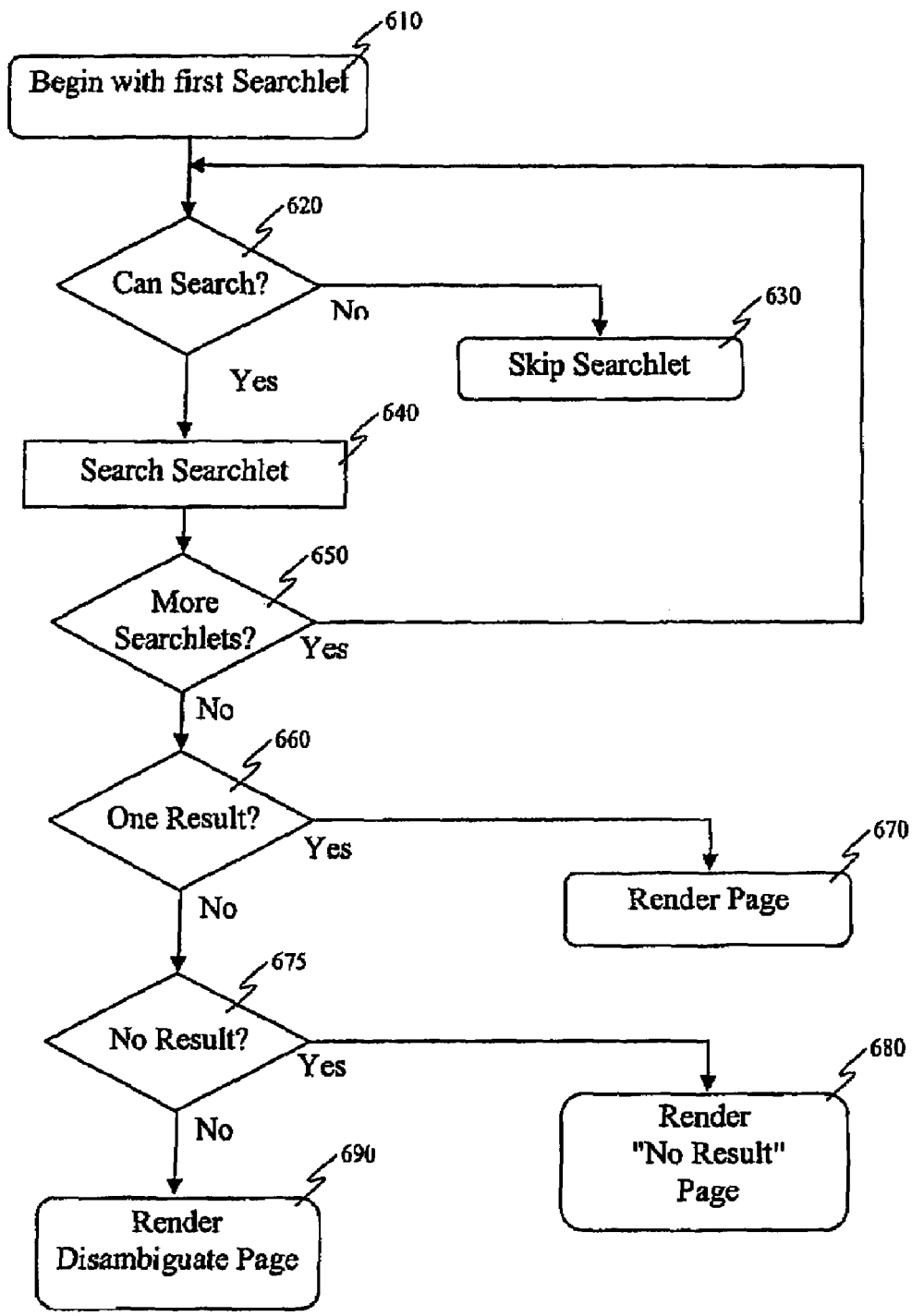
FIG. 6 is a depiction of the operational logic involved in the Content Broker and searchlet interactions for performing a search in the system of FIG. 1.

FIG. 6 is a flow diagram that shows the processing logic involved in the performance of the Can Search interaction 510 and Search interaction 520. The Content Broker begins processing with the first searchlet, indicated by the first flow diagram box numbered 610. Next, the Content Broker questions the first searchlet if it "Can Search?" the submitted user query (initiating the Can Search interaction) at 620. The searchlet parses the user query and makes a quick determination of whether the user query is likely to be searchable, given the content to which the searchlet is tuned.

For example, with the Wallpaper searchlet, where there is no required query syntax and a large collection of keywords in the index, the Wallpaper searchlet might always return a "yes" response to this question. For a searchlet that requires the query to be in one or more specific syntax structures, for example an airline schedule searchlet that looks up the status of an airline flight, the "Can Search" interaction is used to determine if the query contains the name or abbreviation of an airline that is recognized and available for search. If the airline name or abbreviation is not found in the query, then a "no" response is returned to the Content Broker for the "Can Search" interaction at box 620, and the more expensive operation of searching the airline schedule index can be avoided. That is, if the searchlet responds to the "Can Search" interaction with a "No" response at 620, then no further interaction occurs with that searchlet for the query and processing with that searchlet is terminated at 630.

If the searchlet responds to the "Can Search" interaction with a "Yes" response at 620, then the Content Broker next asks the searchlet to perform a search for the user query, as indicated at 640. The Content Broker then repeats this processing for the next searchlet at 650, repeating the "Can Search" interaction and, if applicable, the Search interaction, for all the searchlets. The Content Broker keeps a count of the number of searchlets that returned a page from the "Search" interaction at 640, as well as keeping a list of the pages themselves. It should be noted that a searchlet can respond affirmatively to the "Can Search" interaction but yet fail to return a page in response to the "Search" interaction. If exactly one Searchlet has responded with a page, then the user query has resulted in a single page as the result, and that single page is rendered as the search result at 670, ending the search processing for the user query. If no single result was returned, a negative outcome at box 660, and if it is true that no searchlet responded to the search interaction with a page, an affirmative outcome at box 675, then processing continues at step 680 to being next-tier processing, as described in connection with FIG. 4. The next-tier processing can result in the special "No Result" page that is rendered as described in connection with box 460 of FIG. 4. If a null result was not obtained, meaning more than one searchlet has responded to the Search interaction with a page, a negative outcome at box 675 has occurred and at 690 a "Disambiguate Page" is generated. The Disambiguate Page contains multiple results and is described further below.

Figure 7:
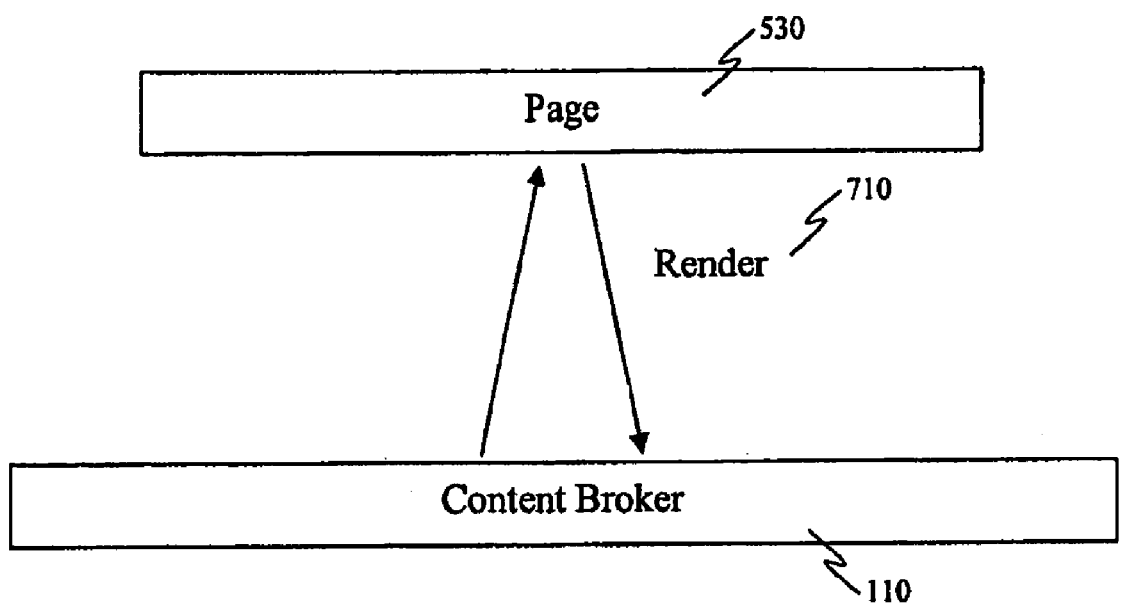
FIG. 7 is a depiction of the processing executed by the Content Broker for a single Render interaction with a Page in the system of FIG. 1.

In any of the above cases, the result of a successful search interaction is a "Page" 530 (FIG. 5). Unlike a conventional Web search, where the results are commonly rendered into HTML, there are multiple markup languages used to render results on mobile computing devices such as handsets which adds significant complexity to the mobile search invention. Thus, the results of the mobile search engine are not necessarily HTML, but instead an indeterminate data construct called a "Page" 530 herein, which can be rendered as XML or as a number of other markup languages. FIG. 7 is a depiction of the processing executed by the Content Broker that includes a single Render interaction 710 with a Page 530. In the Render interaction, the Content Broker passes the desired markup language, the target handset model, and other details of the search query to the Page. The Page 530 has methods that permit it to return the resulting markup language to the Content Broker, where the Page data and markup language are ultimately passed back to the mobile computing device handset which initiated the search, for proper rendering and display to the user. Those skilled in the art will understand that such processing is conventional for mobile devices and their associated browser applications in rendering display pages in a variety of formats.

Figure 8:
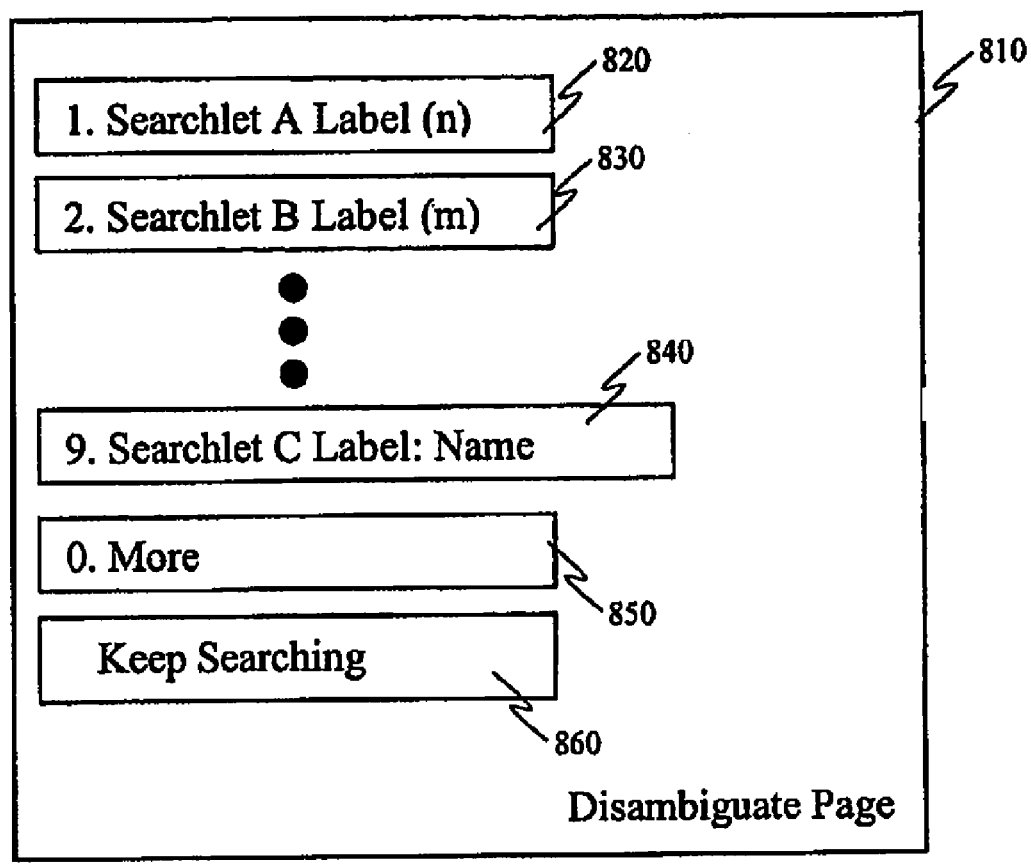
FIG. 8 is a depiction of additional details with regard to the Disambiguate Page illustrated in FIG. 6.

FIG. 8 provides additional details with regard to the Disambiguate Page referred to in connection with FIG. 6. The exact look-and-feel of the Disambiguate Page is determined partially by the markup language used to generate the page and partially by the detailed implementation of the mobile search engine, as selected by a system administrator or other authorized person. The configuration of the Disambiguate Page should be carefully selected during initial setup and configuration to ensure optimal interaction with the page on a mobile handset display. Each searchlet that provided a Search result Page at box 640 of FIG. 6 is listed on a Disambiguate Page such as the page 810 illustrated in FIG. 8. Each searchlet that returned a Page is listed on the Disambiguate Page 810 in one of two forms, either the searchlet name with an indication of number of returned items, or searchlet name with a result page name.

More particularly, if the search result page from a searchlet comprises a list of answers, then the Disambiguate Page entry for that searchlet is displayed in the form of "Label (n)", where "Label" is a human-readable name for a searchlet (e.g. "Wallpaper", "Ringtone", or "Weather") and "n" is the number of items in that list of answers, as illustrated at 820, 830 in FIG. 8. For example, an entry in the Disambiguate Page of "Wallpaper (12)" would indicate that the Wallpaper searchlet returned twelve items (pages) as search results for the user query. Alternatively, as shown at 840, if the search result from a searchlet comprises exactly one answer (page), then the Disambiguate Page entry for that searchlet is displayed in the form of "Label: Name", where "Label" is the searchlet name, as in 820 and 830, and "Name" is the name of the single answer (page). For example, a Disambiguate Page entry of "Weather: Seattle, Wash." indicates that the Weather searchlet returned only one page, comprising weather data for Seattle, Wash., in response to the user query, and a Disambiguate Page entry of "Flight Status: Alaska 321" indicates that the Airline Schedule searchlet returned only one response, flight information for Alaska Airlines flight 321, to the user query. Any of the entries on the Disambiguate Page can be in either of these two forms, 820 and 830 or 840, or in other similar forms as may be desired by the system administrator.

As shown in FIG. 8 at 850, due to the limited size of the display screen and the limited input mechanisms of mobile computing devices, the best practice for displaying lists on a mobile handset is to limit an individual page to nine items, numbered 1 through 9, or to some other number of items that will comfortably fit on the device display screen. To display more than nine items, tenth item 850 is included with the label "More", "Next 9", or something similar that indicates additional items are available such that a user can designate that label for execution and gain access to the next group of items in the search results list. Thus, if there are more than nine searchlets with results, the Disambiguate Page may be implemented by multiple screenfuls of lists and may require multiple requests from the handset to the search system to display all of these items.

The Disambiguate Page also needs a means to allow the searcher to access all the tiers of searchlets. In the system 120, this is accomplished by providing an additional item on the Disambiguate Page labeled "Keep Searching", "More", "None of the Above", or a similar legend that initiates a search in a next tier of searchlets, such as corresponding to the operation at 410 of FIG. 4. The subsequent search initiated by the Keep Searching item 860 will be performed on the subsequent tier of searchlets instead of the current tier. In this way, a user can move from Tier 1 to Tier 2 and so forth. This continuation item 860 is, in fact, needed on every Page which is not the result of a searchlet from the "bottommost" tier, as any of those pages can be the result of a search in which the Content Broker has not communicated with all the searchlets.

System Description

The system described herein can be implemented in a mobile device advertising platform that provides an advertising solution for the mobile device market space that is performance based and that provides the user with an enriched browser experience. Such a platform has been developed by the assignee of the present application, Medio Systems Inc. of Seattle, Wash., USA. The Medio Systems mobile device advertising platform includes components directed to reporting and analytics, with which advertising performance and effectiveness can be determined.

1.0 Medio Systems Platform and the Market

As noted above, advertising on mobile handsets is a nascent market, but a highly discussed topic in the industry. It is expected that a number of mobile advertising platforms will be launched in 2006. However, based on online advertising trends since the mid-1990s, the methods that the advertising community will ultimately adopt and mobile subscribers will accept will likely not shake out until 2008 or 2009.

These market conditions are analogous to the Web in the mid-1990s. Yahoo, Lycos, and AltaVista originally sold impression-based banner ads of various sizes and placement on their search engines, CNN, C|Net, and others did the same on their content websites; and later resellers like DoubleClick and LinkExchange acted as wholesalers for a variety of smaller sites. Later on came paid-placement (Go2.com, later known as Overture) and click-through ads, and then Google introduced the wildly popular self-service model for advertisers using three-line ads in AdWords, and contextually relevant text ads in AdSense.

The business model of Medio Systems is based on development of a performance-based mobile advertising platform and associated revenue model, and bringing this model to market in co-operation with wireless carriers.

2.0 Mobile Centric Advertisements

Mobile advertisements are vastly different from PC-based Web advertisements due to seven primary factors:

No universal browser
Screen size
Keypad input
Network issues
CPU
Memory
Network cost Combined, these factors have a dramatic effect on the customer experience. The Medio System Advertising Platform, as part of the Medio Systems Search System, makes the most of the mobile environment to provide best-of-class search and advertising.

2.1 Browser

Mobile handsets do not feature a universal browser comparable to the PC's Internet Explorer or Firefox. Instead, a mobile handset may use one of dozens of different browsers, in different versions, each of which uses a different subset of WML, XHTML, and Cascading Style Sheets. This fact means that mobile browser content must follow the same write-once, test-everywhere methodology required by custom-developed applications such as J2ME and BREW.

2.2 Screen Size

While the average PC monitor currently averages about fifteen inches diagonally, most mobile handsets' screens measure between 2 and 2½ inches. Handset screen resolution is typically between 120×120 and 172×220 pixels. While the newest popular handsets provide 240×320 resolution, the actual physical size of the screens remains near 2 inches. This fact limits the amount of information that can be presented on a single screen. Normally a single advertisement, or at most three one-line paid-placements, will fit on a mobile screen without severely impacting the overall customer experience. These screen sizes restrict the presentation of information to one long, scrollable column, because there simply is not space for a left-column navigation pane nor a right column filled with advertisements.

2.3 Keypad Input

The desktop or laptop PC uses a mouse or trackpad and a full QWERTY keyboard for input and navigation. Mobile handsets have standardized on a 12-key numeric telephone keypad, a 5-way navigation control, and 2 softkey buttons. Some phones also include a dedicated "back" or "clear" button, others a third softkey, and many provide a second up/down toggle for adjusting volume. These auxiliary buttons simplify the most common actions, but do not change the customer experience as a QWERTY keyboard would. This restricts the potential navigation options within a single displayed page. Selecting an item at the bottom of a page, for example, is an order of magnitude more cumbersome on a mobile phone than on a PC browser, requiring up to 20 key presses vs. one click of a mouse. Similarly, viewing a piece of information "below the fold" is much more difficult on a mobile screen than pressing Page Down or using a scroll bar on a PC. Scrolling a page to the bottom can require dozens of key presses and can cause frustrated customers to stop using their handset for data services.

2.4 Network Issues

Typical wireless networks include relatively large latencies and relatively low throughput. Even EVDO and UTMS networks include latencies which feel like a long wait to a customer who is accustomed to a broadband PC connection. Research has shown that the more portable a device, the lower all latencies must be to feel like a quick response. On a PC, an application that starts within 5 seconds provides an acceptable experience. On a notebook, returning from standby can take up to 10 seconds before causing frustration. However, on a handheld device, any delay of greater than 100 milliseconds is noticeable. Handsets are panned in reviews if pressing a button does not bring an "immediate" response.

In the near term, wireless networks are not likely to gain enough speed to feel quick and responsive. Despite the promised speeds of 3G networks, the average delivered speeds are still slower and more jitter-prone than the broadband connection that customers are used to at work and at home.

2.5 CPU

Over the past few years, CPU speeds on mobile handsets have improved dramatically in all benchmarks. However, much of that CPU improvement is consumed in powering wireless networks with higher data speeds, driving larger displays, and in driving enhanced user interfaces. The residual CPU capacity continues to increase, but still lags far behind the CPU speeds found on even the cheapest of PCs.

This difference affects a device's apparent speed in scrolling a page, animation frame rates, and ability to simultaneously stream data while the customer interacts with an application. Along with the network capacity, CPU power limits the number of images that can appear on a single page, and more fundamentally, limits the complexity of applications built on mobile handsets.

2.6 Memory

While amount of RAM available on mobile handsets has increased dramatically over the past few years, it is typically still measured in single-digit megabytes, while a typical PC boasts at least a half of a gigabyte. Handsets' flash memory storage has also increased, but still pales compared with the storage on a PC. Few mainstream handsets today have slots for removable memory cards. Disk drives are now found on a handful of mobile handsets, but are unlikely to appear on mainstream devices for a few years, due to price, size, and dramatic effect on battery life.

A handset's relatively small amount of memory affects the "slickness" of any mobile advertising, especially when combined with the small amount of data which can realistically be downloaded within one second across a wireless network. The result typically limits animations to one or two frames per second, vs. 20 frames per second on a PC. The almost complete lack of persistent memory further reduces the "slickness" of mobile advertising. The cache on a handset is severely restricted, thus few advertisements can be cached. This results in less relevancy for cacheable ads, and reloading ads increases network usage.

2.7 Network Cost

While many consumers pay a fixed monthly fee for PC and wireless bandwidth, the actual cost of delivering one kilobyte of data over a wireless network far exceeds the cost on the wired Web.

This is often the primary limitation to providing the best possible customer experience. Within the next three years, wireless' capabilities will increase dramatically:

Typical screen resolutions up to 320×480;

5-way navigation controls replaced by an analog joystick of similar size;

4G networks with lower latencies and higher throughput;

CPUs at least twice as fast as today;

RAM capacity for tens of seconds of animation frames;

Flash memory capacity for hours of video.

Despite all of these improvements, unless the cost per kilobyte of bandwidth drops dramatically, wireless carriers will be forced to limit the amount of data per page, and thus limit the customer experience. This is a hot topic today. While a text-only page might use only three-quarters of a kilobyte, a page with one small image can often be 4K of data or more. The bandwidth cost difference, over millions of pages and millions of subscribers, is significant.

3.0 Medio Systems Advertising Platform

3.1 Overview

Medio's solution will provide a mobile-centric, performance-based advertising system, complete with a web-based application for bidding on ad placement based on keywords, concepts, location, and customer profile. Advertising types will include text ads, banner ads, interstitial ads, paid placements, and pay-per-call.

This Advertising Platform includes three major components:

Web-based Advertising Management, Reporting & Analytics Toolkits

A web-based Advertiser Bidding System

An Advertisement Placement Engine/Optimizer

3.2 Advertising Management, Reporting & Analytics Toolkits

The web-based Advertising Management Toolkit provides monitoring of search traffic and advertisement placement for Medio's wireless carrier partners.

In addition, this console includes an interface for "digging down" into the performance of any advertisement using analytics, generating reports, and exporting data into other analysis tools.

3.3 Advertiser Bidding System

Today, a blue hyperlinked ad title followed by two lines of text is sufficient for the experience on the PC-based web. However, mobile demands more creative, intuitive, and functional advertisements. For instance, how would users experience today's web ad inventory when most HTML sites are not viewable from a mainstream mobile device?

Medio's Bidding System will necessarily be both more feature-rich and complex than Google's AdWords (above), but will include similar functionality, providing a self-service set of tools for advertisers large and small.

3.4 Advertisement Placement Engine/Optimizer

The key Advertising Platform component, and by far the most complex, is the Advertisement Placement Engine. This component uses the rules and bids from the Bidding System to optimize the best advertisement for every search and information page delivered by Medio's servers.

Generally, the Advertisement Placement Engine uses this formula:

$$CTR*CPC*P(A)$$

Where CTR=Click Through Rate, CPC=Cost Per Click or Cost Per Thousand, and P(A) is a Predictive Analytic measure of whether a particular advertisement to be likely to be clicked, based on the search keywords and the subscriber's search and click-through history. This is one of the unique, patent-pending technologies that Medio has developed for mobile advertising that produces significantly increased revenue.

4.0 Types of Advertisements

Medio's Advertising Platform initially features four forms of advertisements:

Banner Ads
Interstitial Ads
Paid Placement
Pay-per-Call

Over time, subscribers and advertisers will eventually agree upon the most acceptable and effective forms of advertising, and Medio expects to add other forms as the market matures.

4.1 Banner Ads

Screen "real estate" is a much more precious commodity on mobile handsets than on the PC-based web. Whereas on a 15-inch monitor a 600×80-pixel banner is unobtrusive, that one image contains more pixels than entire screen on most popular handsets. Similarly, three or four banner advertisements, in a 200-pixel-wide column along the right side of a web page, are considered unobtrusive. In the mobile world, two columns are feasible only on the largest of smart phones.

Banner ads in Medio's Advertisement Platform can consist of text, images, or animations, depending on the markup language, the capabilities of the handset, and the advertiser's creative choice. Unlike Google's three-line text ads or PC-based banner ads, all of the above variants must be provided by the advertiser. Banner ads can be purchased on an impression or performance (click-through) basis.

4.2 Interstitial Ads

Network latency on wireless networks is a minimum of two seconds, and typically four to six seconds, while initial network access can take as long as 20 seconds. Many complex PC-based web pages (such as a GMail inbox) can take a similar amount of time to load. However, the expected latency on handheld devices is much lower than on a PC, making even two seconds feel like a long time to wait. This latency is an opportunity to present the most unobtrusive of advertisements, namely interstitial ads. Like banners, interstitials can use text, images, or animations. As with banners, the advertiser must provide variants for a range of handset capabilities.

To compensate for latency, an initial set of interstitial ads must be resident on the client, and the at least part of the Advertisement Placement Engine must also be resident on the handset. This enables the interstitial ad to essentially fill the time that the network and client require to display the next page. After the page is downloaded, the search system updates its cache of interstitial ads, adding those most relevant to the keywords or page. Interstitials are likely to be impression-based to start, but click-throughs can be performed and measured on an interstitial ad as well.

4.3 Paid Placement

Paid placement search results are an acceptable form of advertisement on the PC-based web. Similar paid placements will be possible in Mobile Search, although screen dimensions limit the number of paid placements that can be displayed prior to any algorithmic search results. Paid placement results can include yellow page listings, "featured" merchandise, or cross-promotions. Paid placements are always performance-based.

4.4 Pay-Per-Call

The pay-per-call model is fairly new on the PC-based web. Implementation of this model generally includes VoIP clients and/or special toll-free phone numbers that must be carefully tracked. This adds to the complexity of this model, and for this and other reasons, click-through ads which lead to a web site are much more popular than pay-per-call.

On mobile, the most intuitive action is to speak on the phone. Medio expects that a very common action upon selecting an advertisement is to dial a phone number. This also takes advantage of a significant limitation: most advertisers will not have a mobile-displayable website, and many may not have any website.

The pay-per-call model is ideal for local merchants. These businesses pay large sums of money to advertise in the Yellow Pages and in local newspapers. They understand the value of a customer calling their phone. These calls are valued in dollars, not pennies, and thus represent a significant, untapped opportunity.

Pay-per-call also works for national advertising campaigns. It is the flipside of telemarketing, enabling interested customers to call in instead of hiring vast pools of callers to make intrusive cold calls. It is far easier to close a sale over the phone than via a web site. Pay-per-call is always performance-based.

5.0 Types of Bidding

Medio's Advertising Platform includes an auction model for advertisement placement, allowing advertisers to bid on multiple placement types:

Keyword
Concept
Profile
Location

This goes beyond the simple keyword-based placement typically seen on the web. The follow subsections explain each of these placement types.

5.1 Keyword

This is the method commonly found on web search engines. An advertiser specifies a keyword, set of keywords or exact phrases, and the advertisements are displayed on search results related to those keywords, or on pages contextually related to those keywords.

5.2 Concept

Medio's Search System incorporates much more insight into the actual concept being searched. For example, when a subscriber searches for "Usher", the search results are grouped by concept, such as Ringtones, Wallpaper, Games, News, and more. Advertisers can place bids based on any of these concepts. Each of these concepts is composed of sub-concepts. For example, Ringtones may include Hip-Hop Ringtones or Truetone Ringtones.

Bidding for concept avoids the difficulties inherent in bidding for keywords, wherein an advertiser must research a set of keywords which match the target concept. It allows, for example, the automaker Jaguar to bid on the concept of "Automobiles" and avoid placement with results featuring jaguar cats.

5.3 Profile

Medio's Search System is fully personalized, analyzing the full search history of each customer and grouping customers into common profiles. For example, customers who generally search for ringtones can be organized into a "Ringer Buyers" profile, and customers who often read their horoscope can be organized into an "Astrology" profile. With the carrier's assistance, profiles for age, gender, and home town are also possible.

Profiles allow advertisers to target audiences, no matter what those customers happen to search in any day. In addition, profiles can be added to the other placement types to limit advertising placement to specific profiles, even in keyword-generated results.

5.4 Location

Medio's Search System is location-aware. Location may consist of little more than the last or most-frequently specified city for a weather forecast, or it can become as specific as the current cell tower identifier, or a GPS-derived location accurate to within a few meters. This provides local advertisers with the ability to participate in the mobile advertising market.

As mobile devices incorporate location technology, all carriers will eventually provide highly accurate location data, allowing for location-sensitive advertisements. For example, the nearest Starbucks can provide a special offer to subscribers who are within two blocks of the store, and different offers for subscribers more than one mile away.

Like profiles, location can be added to the other bidding systems to better target customers who are searching for specific types of content. This should greatly increase the relevancy, and thus the action-rate, of advertisements, resulting in higher average bids.

6.0 Advertisement Relevancy

A search engine with an integrated advertising platform has proven to be a key combination for delivering relevant advertisements that achieve results for advertisers. The same should hold true for mobile.

There are two methods for achieving relevancy. First, the keywords used in search queries help explicitly match a customer's intent with an advertisement. Second, when viewing news articles and other information sources, it is possible to perform an implicit, contextual search based on the contents of the page.

6.1 Explicit Search

Medio's Search System uses text-based search queries. A query is mapped to keywords and concepts culled from various searchable information sources, providing results relevant to the customer. Similarly, these keywords and concepts, combined with the location and profile of the customer, are used by the Medio Advertising Platform to match the most relevant advertisement to the search results.

For example, Callaway Golf can bid for the concept of "golf." If a customer searches for a golf celebrity, such as "tiger woods" or "annika sorenstam", or golf tournaments, such as "US Open" or "Masters", the search will automatically be associated with the concept of "golf" and the customer will receive search results including games, wallpaper, and news stories of the respective golf celebrity or tournament, along with the Callaway advertisement. Thanks to Medio's unique concept-based targeting, Callaway does not need to list all possible keyword combinations to appear in all golf-related results.

In another example, Nike can bid for the concept of "basketball," and for the profile of "Urban Music Listeners". If a customer who previously purchased a 50 Cent ringtone later searches for "raptors", the Nike ad appears, along with the latest Raptors information, such as game score.

6.2 Contextual Search

In addition to a text search box, Medio's Search System includes multiple forms of contextual search, such as the links presented in search results.

For example, a customer who searches for "pacman" finds a downloadable Pac-Man game. That page will also include recommendations for other games such as Asteroids. If the customer follows the Asteroids link, Medio's Search System knows that the page falls under the concept of "games" and that Asteroids is a "retro" game. Electronic Arts could bid for an ad under those concepts, or simply using the keyword "asteroids," to have its ad presented on that page, even though the customer never actually typed in that text.

Similarly, a customer searches for "cnn" and receives a list of top news stories from CNN. Following one link, he reads a news story. Medio's Search System will extract the keywords and concepts described in that news story, and present a relevant advertisement. Again, the customer did not type a specific keyword, but a relevant advertisement appears.

Addendum A. Medio Systems Advertising Platform

The Medio Systems Advertising Platform is a customized solution, provided by Medio Systems, that is tailored for Medio Systems customers, such as particular service providers.

A.1 The Goal

The goal of the Medio Systems Advertising Platform is to increase customer revenues by selling ad placements of various types across all the possible data services. This goal has been reached today on the PC-based Web, and Medio believes it should carry over to mobile handsets.

This document describes mobile banner, interstitial, paid-placement, and pay-per-call advertisements. These can be integrated into the existing WAP browsing experience, the WAP search experience, the "rich" search application, ultimately deep within the pages of the content providers' pages, and perhaps even into the downloadable games and videos.

A.2 Eyeballs First

It is generally not accepted practice in the industry to have advertisers ready to buy ad placements without sufficient related "eyeballs" to view those ads. Those eyeballs need to belong to recurring customers, and the initial experiences of those customers can not be compromised by an abundance of ads or the constant repetition of identical ads; the proper balance of advertisers and search inventory is necessary to maintain a healthy performance-based advertising ecosystem.

From today's web-based systems we know the advertising dollars of the first few tens of millions browsed pages and search results are of little value compared to more quickly building a search-based experience which leads toward hundreds of millions of searches per month. It is only this greater scale of searches, targeted accurately to the customers' interests, that will lead to large numbers of advertisers and hence will lead to competitive bids—all of which together will add substantial amounts of revenue.

A.3 Example Metrics

Advertising is all about the numbers. No matter the style of ad (i.e. banner, pay-per-call, etc.), advertisers demand large numbers of potential customers in order to justify placing an ad. Take the following example:

Advertiser A is willing to spend $0.10 per "click-through" to find 1000 customers.

A typical click-through rate for a successful ad is 1%.

Suppose on average 100,000 unique customers viewing 10 pages per day.

100,000 customers×5 pages/day=500,000 page views/day
500,000 page views×1%=5,000 click-throughs
5,000 click-throughs×$0.10=$500/day This example assumes every page view includes the advertisement. It in fact assumes every page view includes the same advertisement. Both of those assumptions are flawed. More reasonably, about 50% of the page views will have both a reasonable location to place an ad, and a relevant advertisement to be placed. Plus more reasonably, there will be thousands of advertisers, within only 50% of the advertisements having a successful click-through rate. These two additional factors drive down the expected revenue to as low as $125/day. At that rate, it's simply not worth the effort to deploy advertising, comparatively speaking.

The other assumption hiding in this example is that 500,000 page views have estimated worth of $500/day. If these 500,000 page views are split amongst 1,000 advertisers, then on average there are only 5,000 page views per advertiser per day. At a 1% click-through rate, that is only 50 click-throughs per day. For any large advertiser, that is not worth the effort to manage an advertising campaign.

A.4 Getting the Experience Right

Browsing via a WAP deck is a sub-optimal customer experience. Adding advertisements to that experience is not an improvement. Search, on the other hand, is expected to be a positive and effective customer experience. Adding advertisements to that experience before it is perfected will potentially jeopardize the entire mobile advertising business.

Returning to the previous example, but moving forward to many months from now when search is a common daily use on a mobile handset:

1,000,000 customers×2 searches/day=2,000,000 searches/day
5 page views/search*2,000,000 searches/day=10,000,000 page views/day
10,000,000 page views×1%=100,000 click-throughs
100,000 click-throughs×$0.10=$10,000/day This model does not suffer the same flawed assumptions as the previous model. These ad placements are based on explicit and contextual search, and thus each ad is as relevant as possible from the inventory.

The keys to this model are in increasing the average number of searches per customer per day and increasing the average number of page views per search. The former is maximized by providing a great customer experience across a wide number of search categories. The latter is increases by making that experience as "sticky" as possible to ensure more opportunities to present advertisements.

However, generally customers do not want to view advertisements, especially if they are "in the way" of the desired information or in any way slow down the experience. Thus, until mobile search is an ingrained habit, any use of advertising that degrades the customer experience may prevent that habit from forming, lower the number of customers using search, lower the average number of searches per day, and lower the average number of pages per search. Lowering any of those factors ultimately lessens the revenue opportunity from advertising.

A.5 Relevancy

Placing advertisements is a tightly coupled technology to search. They both have identical goals of displaying the most relevant information to the customer. Both use the search keywords (explicit or implied) from the page. Both can be improved using personalization. Both can be improved using analytic recommendations. For this reason, it makes sense to combine an advertising platform with a search engine. That has been proven multiple times on the PC-based Web. Google and Yahoo far exceed the advertisement placements and revenues of the next nearest competitors.

Relevancy also plays an important role in growing the advertising base. Via the search logs, it is possible to determine that X % of the customer base is searching for topic T. That information can be used to target vendors serving topic T. The actual metrics of number of searches, number of unique customers, etc. can be used to excite those vendors sufficiently to sign up with the service provider as advertisers. This targeted sales process avoids having large numbers of advertisers targeting unpopular topics, which would lead toward large numbers of unhappy advertisers. This is part of the virtuous cycle of search+advertising.

A.6 Conclusion

Medio Systems brings critically important Thought Leadership, Mobile Centric advertising approaches, Search expertise, new Advertiser Bidding Options, and wide-scale production experience to produce the world's leading mobile search and advertising services for mobile carriers.

Medio Systems Architecture

The exemplary embodiments described above in conjunction with the drawings of FIG. 1 through FIG. 8 can be implemented in an architecture that utilizes software installed client-side on the mobile devices and also installed server-side for performing the search function, supporting ad placement bidding, and for providing access to content. An example of one such implementation is illustrated in the architecture diagram of FIG. 9, in which the mobile device installed software is represented by the "Client" depiction 902, the search engine software is represented by the "Search Platform" depiction 904, the ad placement bidding software is represented by the "Advertising Platform" 906 and "Ad Placement Optimizer" depiction 908, and the content access software is represented by the "Content Broker" depiction 910.

Figure 9:
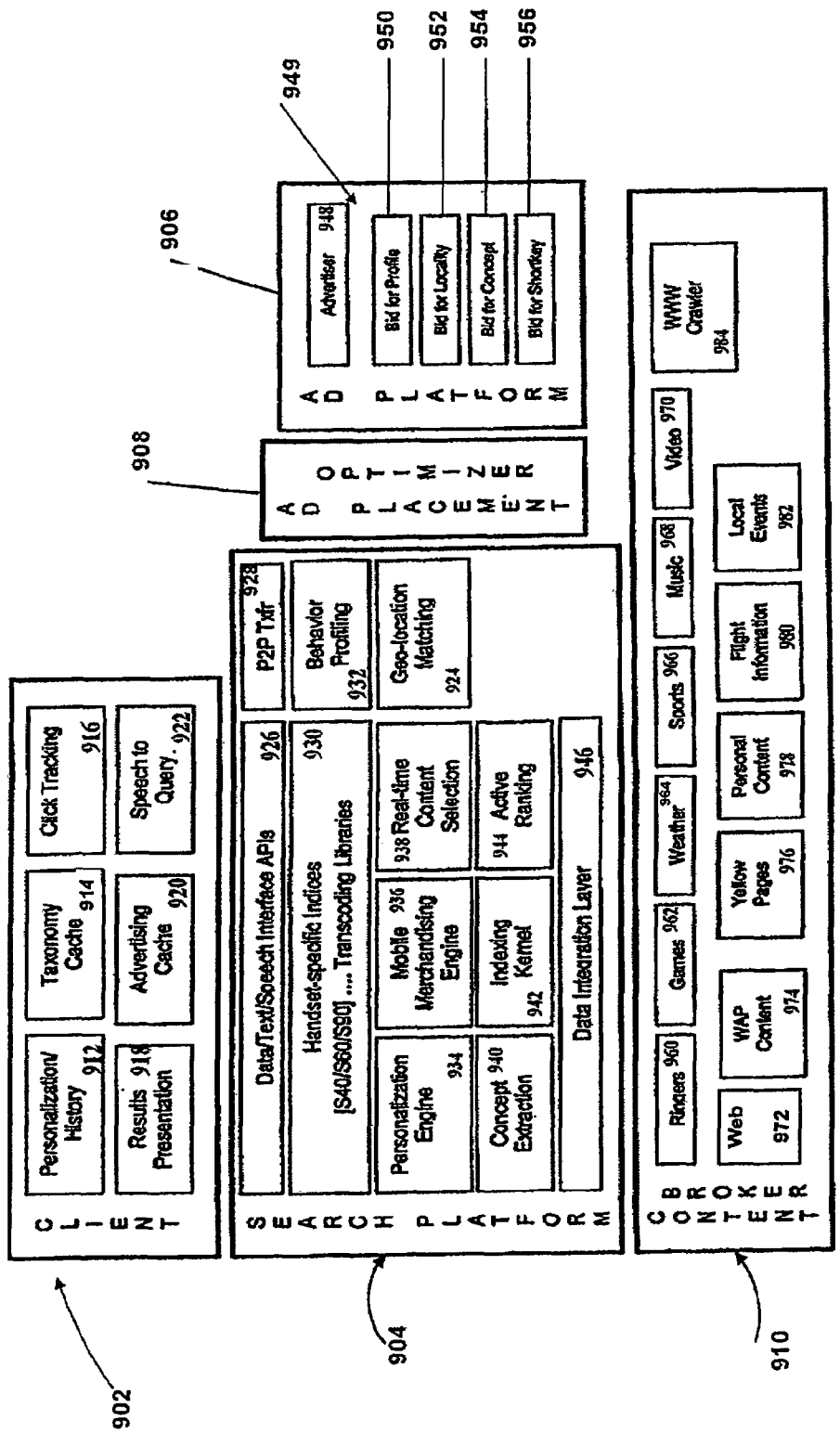
FIG. 9 is a block diagram of exemplary software architecture for the system illustrated in FIG. 1.

Thus, in the exemplary embodiment of FIG. 9, the client software includes procedures or modules to provide a personalization history with user preferences 912, a taxonomy cache 914, click tracking for the user 916, results presentation for rendering pages 918, an advertising cache 920 for received advertiser pages, and a speech-to-query module 922, if desired.

Also in FIG. 9, the Search Platform 904 is illustrated as having a variety of modules and functions. It should be understood that modules providing features and functions in addition to those necessary for the operation as described in accordance with the invention are optional. For example, device position location determination is not necessary to all embodiments described above, and therefore the "Geo-Location Matching" module 924 depicted in FIG. 9 is optional.

In the CLIENT component 902:

a. The Personalization/History component 912 stores the recent searches performed by the subscriber. This is used to tune the search experience within the handset without requiring an interaction with the server.

b. The Taxonomy Cache component 914 stores the popular keywords, concepts, and categories. This is used by the Personalization/History component 912 to further tune the search experience.

c. The Click Tracking component 916 stores all the key presses and other forms of input with the handset-resident application. This information is periodically passed down to the server and used as part of the analytic feedback methods which provide personalized and generalized improvements to the overall search system.

d. The Results Presentation component 918 renders the search results and other information on the handset.

e. The Advertising Cache component 920 stores interstitial images and other advertisements for display on the handset without requiring an interaction with the server.

f. The Speech to Query component 922 performs all or part of the speech query recognition.

In the SEARCH PLATFORM component 904:

a. The Data/Text/Speech Interface APIs 926 allow external clients and services to perform searches using the SEARCH PLATFORM. This component additionally contains the APIs which interface the Medio client with the Medio search server.

b. The P2P Txfr component 928 encodes search results as SMS, MMS, WAP Push, IM, Email, and other messaging formats allowing sharing of search results between subscribers.

c. The Handset-specific Indices component 930 stores information cross referenced by handset model. This component includes libraries which can optimize the presentation of the search results for each handset model including transcoding of image sizes and transcoding of web markup and other file formats for viewing on mobile handsets.

d. The Behavior Profiling component 932 performs data mining and other analytic methods whose results are used to improve the search results and to personalize the search results for individual subscribers.

e. The Personalization Engine 934 uses the analysis from the Behavior Profiling component 932, the data from the Click Tracking component 916 in the Client, and other data provided by the carrier to personalize the search results for individual subscribers.

f. The Mobile Merchandising Engine component 936 uses data mining and other analytic methods to produce recommendations of content related to the content found in the search results.

g. The Real-time Content Selection component 938 integrates external databases of content within the search results.

h. The Geo-location Matching component 924 uses the location of the subscriber initiating the search to filter the set of search indices used to perform the search as well as filtering the search results in order to make them more relevant to the specific location.

i. The Concept Extraction component 940 disambiguates the search query, extracting the likely meanings of ambiguous search terms and parsing queries containing syntactic properties.

j. The Indexing Kernel component 942 contains the core search index libraries, the core search crawler libraries, and assorted other libraries which form the basis of the search engine's ability to search.

k. The Active Ranking component 944 re-orders the search results based on analyzed global and personalized usage history.

l. The Data Integration Layer component 946 ties together the data analysis information, the search indices, and other data warehouse information.

The AD PLACEMENT OPTIMIZER component 908 interfaces with a multitude of advertising inventory databases, e.g. Overture Network and Medio s own inventory, and places the advertisement which maximizes the advertising revenue opportunity.

The AD PLATFORM component 906 integrates advertising inventory from a multitude of advertising networks 948, e.g. Overture Networks, plus it includes a performance based advertising bidding system 949 with bidding based on customer profile 950 location 952, search concept 954, and search query shortkeys 956, as well as keywords.

The CONTENT BROKER component 910 contains a set of highly tuned search engines plus the methods required to combine the results from all those search engines into a single page of results. The individual "searchlets" can be created for any type of digital content, including such examples as shown: ringtones 960, games 962, weather 964, sports scores 966, music downloads 968, video 970, web sites 972, WAP sites 974, Yellow Pages 976, content stored on subscribers' PCs 978, flight status 980 and local events 982.

The "Content Broker" block 910 in FIG. 9 represents an application that manages access to, and download of, content from the network, such as the Internet or other content sources, including commercial sites where such content may be purchased. For example, such content may include Web sites that provide ringtones, games, weather, sports, music, and video. The Content Broker may utilize a Web crawler 984 to obtain such information.

Figure 10:
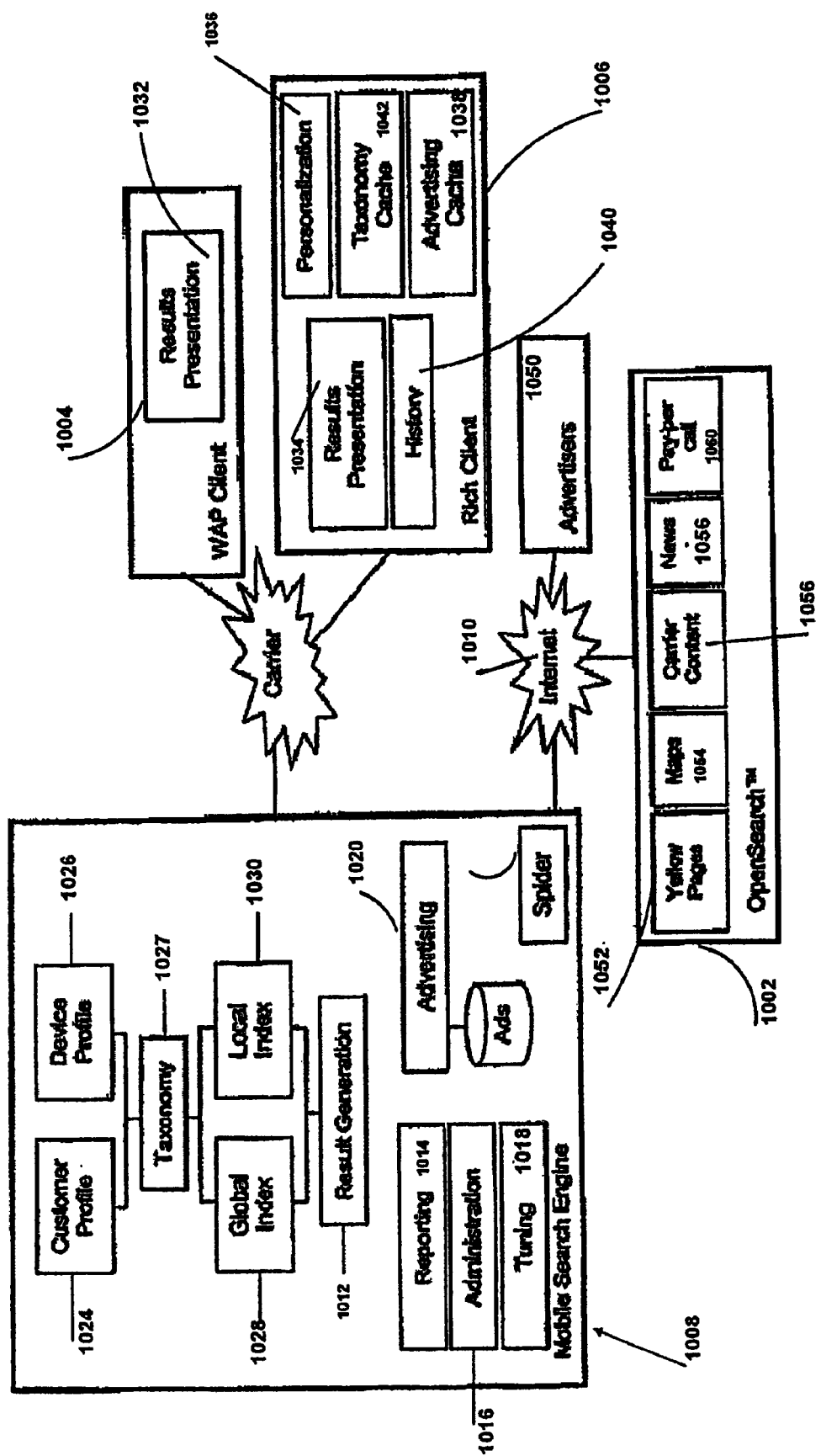
FIG. 10 illustrates an exemplary arrangement of components for a system constructed in accordance with the invention.

FIG. 10 illustrates an example of how the device clients, search engine, advertisers, and search facility (indicated as "OpenSearch" 1002 in FIG. 10) can be arranged in accordance with the invention. The device client, indicated in FIG. 10 as either a "Rich Client" 1004 or a "WAP client" 1006, communicates with the device carrier, through which the client (user) gains access to network content and to the Search Engine. The Search Engine 1008, in turn, gains access to advertisers 1050 and to the OpenSearch facility 1002 through Internet communications 1010.

The Search Engine component 1008 in FIG. 10 contains the methods for generating a search result 1012, for generating reports on the use of the search engine 1014, an interface for administrating the search engine 1016, an interface for tuning the search engine and ranking subsystem 1018, an advertisement placement engine 1020, and a spider/crawler subsystem 1022 for creating the search index. Search results are personalized based on a customer profile 1024, filtered based on the device profile 1026, and the search is performed across both the global index 1028 of accessible content in addition to a local index 1030 of content resident on the handset or resident on the subscriber's home PC or personal network storage locker.

The WAP Client component 1004 contains only a results presentation component 1032.

The Rich Client component 1006 contains a results presentation component 1034 and personalization component 1036, plus components to locally cache advertising 1038, history 1040, and search taxonomy 1042.

The Advertisers box 1050 represents the set of advertisers who access the advertising bidding component 1020 of the Search Engine 1008 via the Internet 1010 in order to place bids for advertisement placements.

The OpenSearch™ component 1002 allows external service providers to create Searchlets whose results can be integrated into the search results generated internally within the Search Engine 1008. Exemplary searchlets include external service provider searchlets via Yellow Pages 1052, maps 1054, carrier content 1056, news 1058, and pay-per-call 1060.

As noted above, the operations described as being performed by the advertisement placement system in accordance with the invention can be performed by a computer processing apparatus. In accordance with well-known techniques, such operations on a computer processing apparatus can be implemented by means of installing processing software onto the computer processing apparatus. This is typically achieved by means of a program product containing appropriate program instructions (software). For example, the program product may comprise optical media such as a data CD or DVD that contains appropriate software to cause the computer apparatus to perform the described operations when the software is installed. Likewise, any software to be installed on any of the computing devices described herein can be achieved with such program product devices to install the appropriate software onto the device for execution.

As noted above, the operations described as being performed by the system in accordance with the invention can be performed by a computer processing apparatus. In accordance with well-known techniques, such operations on a computer processing apparatus can be implemented by means of installing processing software onto the computer processing apparatus. This is typically achieved by means of a program product containing appropriate program instructions (software). For example, the program product may comprise optical media such as a data CD or DVD that contains appropriate software to cause the computer apparatus to perform the described operations when the software is installed or may comprise other signal bearing media including a data signal. Likewise, any software to be installed on any of the computing devices described herein can be achieved with such program product devices to install the appropriate software onto the device for execution.

Having fully described several embodiments of the present invention, other equivalent or alternative methods of practicing the present invention will be apparent to those skilled in the art. These and other embodiments as well as alternatives and equivalents to the described system will be recognizable to those of skill in the art after reading the description herein. The scope of the invention should not, therefore, be determined solely by reference to the above description, but instead should be determined with reference to the appended claims along with their full scope of equivalents and alternatives.

We claim:

1. A computer method of processing a search query from a user, the method comprising:
    inquiring of a plurality of searchlet applications via a content broker as to whether each respective searchlet is capable of performing a search in accordance with a received user search query directed to a database, wherein each searchlet is tuned so it performs searches to identify pages related to only a specialized content grouping of pages, and wherein each searchlet provides a response that is affirmative or negative as to its respective capability for performing the search as a result of internal evaluation to determine if it is tuned sufficiently to capably perform the search;
    passing the user search query to those searchlets that responded to the search capability inquiry in the affirmative, such that each affirmatively capable searchlet returns a response to the content broker comprising a single page, or no page at all if the passed search query fails;
    providing the search results returned from the searchlets in response to the user search query such that the search results returned from each respective searchlet are identified with the searchlet that returned them;
    wherein inquiring comprises directing an initial inquiry to a first tier of searchlets and passing comprises passing the search query to affirmatively responding searchlets of the first tier, and if no search results are returned from the first tier of searchlets, then repeating inquiring and passing to subsequent tiers of searchlets until either a search result is returned or no additional tiers of searchlets remain to inquire.

2. A computer method as defined in claim 1, wherein providing search results comprises providing a disambiguate page containing results from the multiple searchlets presented so as to indicate the multiple searchlets and number of items returned from each respective searchlet.

3. A computer method as defined in claim 1, wherein each searchlet application includes methods for searching a particular category of content.

4. A computer method as defined in claim 3, wherein each searchlet application further includes methods for generating an index of the content category, performing a search on the index, and returning search results.

5. A computer method as defined in claim 1, wherein the processing is performed by a content broker of a search server computer.

6. A computer method as defined in claim 1, wherein inquiring of a searchlet comprises a "Can Search" interaction between the content broker and the searchlet, and wherein passing the user search query to an affirmatively responding searchlet comprises a "Search" interaction between the content broker and the searchlet.

7. A computer system that processes a search query from a user, the system comprising:
    a network interface for communicating with a network through which access to collections of pages is obtained;
    a processor that receives the search query of a user for identifying one or more result pages in a database that are responsive to the user search query, inquires of a plurality of searchlet applications via a content broker as to whether each respective searchlet is capable of performing a search in accordance with the user search query, wherein each searchlet performs searches to identify pages related to only a specialized content grouping of pages and wherein each searchlet provides a response that is affirmative or negative as to its respective capability for performing the search as a result of internal evaluation to determine if it is tuned sufficiently to capably perform the search, passes the user search query to those searchlets that responded to the search capability inquiry in the affirmative, such that each affirmatively capable searchlet returns a response to the content broker comprising a single page, or no page at all if the passed search query fails, and provides the search results returned from the searchlets in response to the user search query such that the search results returned from each respective searchlet are identified with the searchlet that returned them;
    wherein the searchlet applications database is organized into a plurality of searchlet tiers, and the content broker directs an initial inquiry of search capability to a first tier of searchlets and passes the search query to affirmatively responding searchlets of the first tier, and if no search results are returned from the first tier of searchlets, then the content broker repeats inquiring and passing to subsequent tiers of searchlets until either a search result is returned or no additional tiers of searchlets remain to inquire.

8. A computer system as defined in claim 7, wherein the processor comprises a content broker that communicates with a database containing the searchlet applications.

9. A computer system as defined in claim 8, wherein the content broker provides search results by providing a disambiguate page containing results from the multiple searchlets presented so as to indicate the multiple searchlets and number of items returned from each respective searchlet.

10. A computer system as defined in claim 8, wherein each searchlet application includes methods for searching a particular category of content.

11. A computer system as defined in claim 8, wherein each searchlet application further includes methods for generating an index of the content category, performing a search on the index, and returning search results.

12. A computer system as defined in claim 7, wherein the inquiry by the processor of a searchlet comprises a "Can Search" interaction between the content broker and the searchlet, and wherein passing the user search query to an affirmatively responding searchlet by the processor comprises a "Search" interaction between the content broker and the searchlet.

13. A program product for use in a computer system that executes program steps recorded in a computer-readable media to perform a method for processing a search query, the program product comprising:
   a physical recordable media;
   a program of computer-readable instructions executable by the computer system to perform operations comprising:
   inquiring of a plurality of searchlet applications via a content broker as to whether each respective searchlet is capable of performing a search in accordance with a received user search query directed to a database, wherein each searchlet is tuned so it performs searches to identify pages related to only a specialized content grouping of pages, and wherein each searchlet provides a response that is affirmative or negative as to its respective ability for performing the search as a result of internal evaluation to determine if it is tuned sufficiently to capably perform the search;
   passing the user search query to those searchlets that responded to the search capability inquiry in the affirmative, such that each affirmatively capable searchlet returns a response to the content broker comprising a single page, or no page at all if the passed search query fails;
   providing the search results returned from the searchlets in response to the user search query such that the search results returned from each respective searchlet are identified with the searchlet that returned them;
   wherein inquiring comprises directing an initial inquiry to a first tier of searchlets and passing comprises passing the search query to affirmatively responding searchlets of the first tier, and if no search results are returned from the first tier of searchlets, then repeating inquiring and passing to subsequent tiers of searchlets until either a search result is returned or no additional tiers of searchlets remain to inquire.

14. A program product as defined in claim 13, wherein providing search results comprises providing a disambiguate page containing results from the multiple searchlets presented so as to indicate the multiple searchlets and number of items returned from each respective searchlet.

15. A program product as defined in claim 13, wherein each searchlet application includes methods for searching a particular category of content.

16. A program product as defined in claim 15, wherein each searchlet application further includes methods for generating an index of the content category, performing a search on the index, and returning search results.

17. A program product as defined in claim 13, wherein the computer system operations are performed by a content broker of a search server computer.

18. A program product as defined in claim 13, wherein the executed operation of inquiring of a searchlet comprises a "Can Search" interaction between the content broker and the searchlet, and wherein the executed operation of passing the user search query to an affirmatively responding searchlet comprises a "Search" interaction between the content broker and the searchlet.

* * * * *